J. RAU.
GLASS BLOWING MACHINE.
APPLICATION FILED OCT. 6, 1911. RENEWED JUNE 26, 1913.

1,080,168.

Patented Dec. 2, 1913.

3 SHEETS—SHEET 1.

Fig-1-

WITNESSES:
O. M. McLaughlin
E. A. Mayo

INVENTOR.
John Rau
BY
V. H. Lockwood
ATTORNEY.

J. RAU.
GLASS BLOWING MACHINE.
APPLICATION FILED OCT. 6, 1911. RENEWED JUNE 26, 1913.

1,080,168.

Patented Dec. 2, 1913.

3 SHEETS—SHEET 2.

WITNESSES:
O. M. McLaughlin
E. D. Mayo

INVENTOR.
John Rau.
BY H. Lockwood
ATTORNEY.

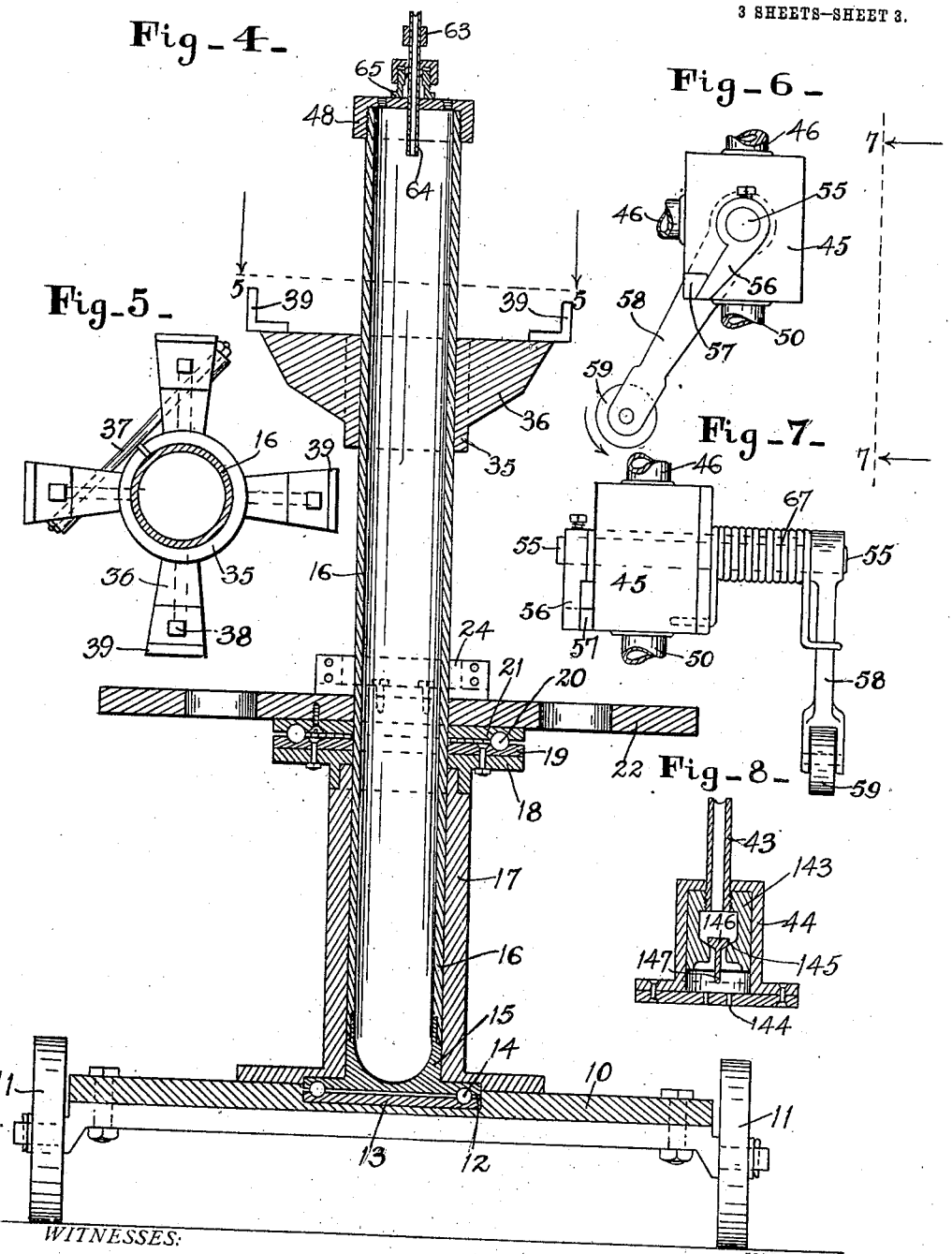

UNITED STATES PATENT OFFICE.

JOHN RAU, OF INDIANAPOLIS, INDIANA.

GLASS-BLOWING MACHINE.

1,080,168. Specification of Letters Patent. Patented Dec. 2, 1913.

Application filed October 6, 1911, Serial No. 653,193. Renewed June 26, 1913. Serial No. 775,962.

*To all whom it may concern:*

Be it known that I, JOHN RAU, a citizen of the United States, and a resident of Indianapolis, county of Marion, and State of Indiana, have invented a certain useful Glass-Blowing Machine; and I do hereby declare that the following is a full, clear, and exact description thereof, reference being had to the accompanying drawings.

The object of this invention is to provide an improved machine for blowing hollow glassware, and the invention relates particularly to the means for supplying, introducing and controlling the compressed air for the blowing.

The invention has been made with reference to the use in a machine for blowing very large, hollow glassware, say bottles, demijohns and carboys of from five to ten or twelve gallons' capacity. Hence the molds are extremely heavy and large and the invention enables such a heavy machine to be conveniently operated and be strong and durable.

The full nature of the invention will be understood from the accompanying drawings and the following description and claims.

Figure 1:
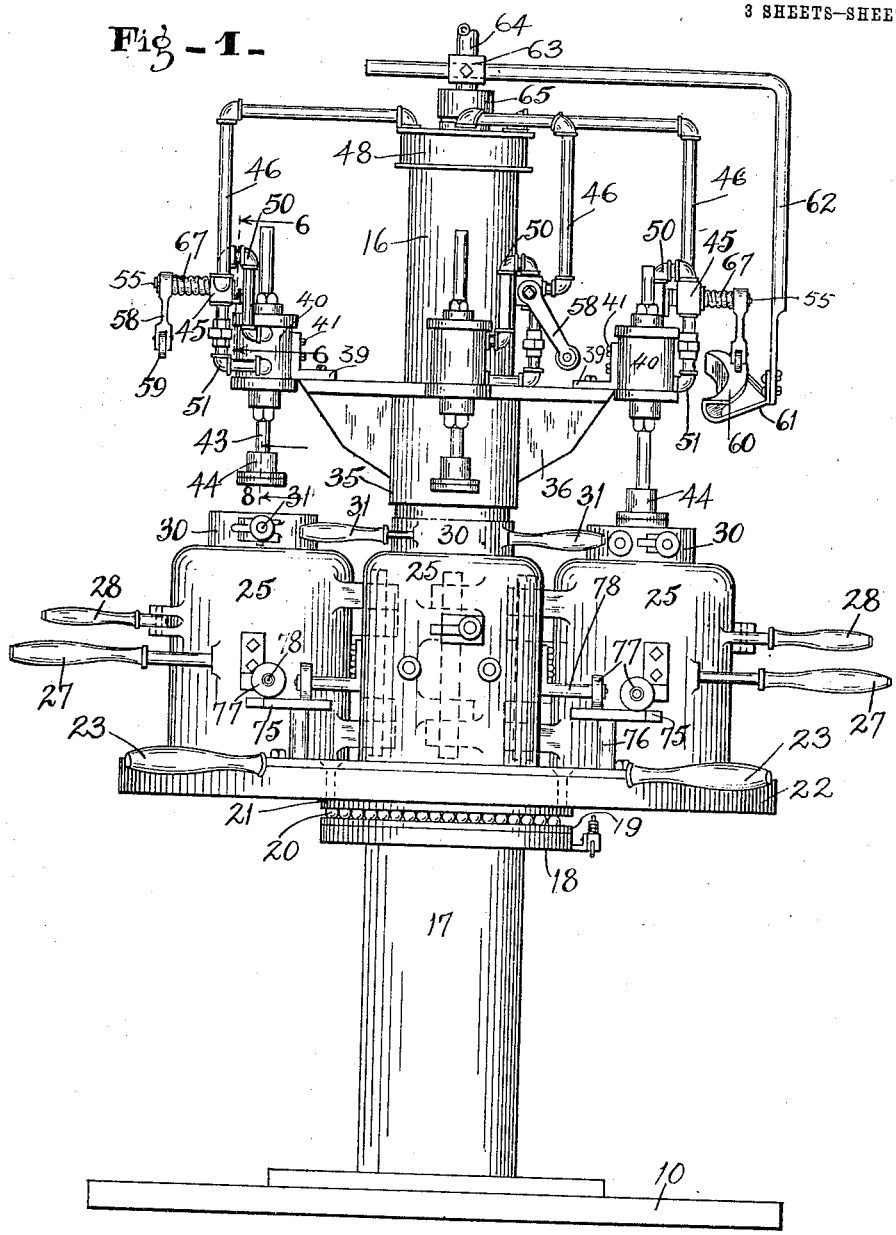
Figure 2:
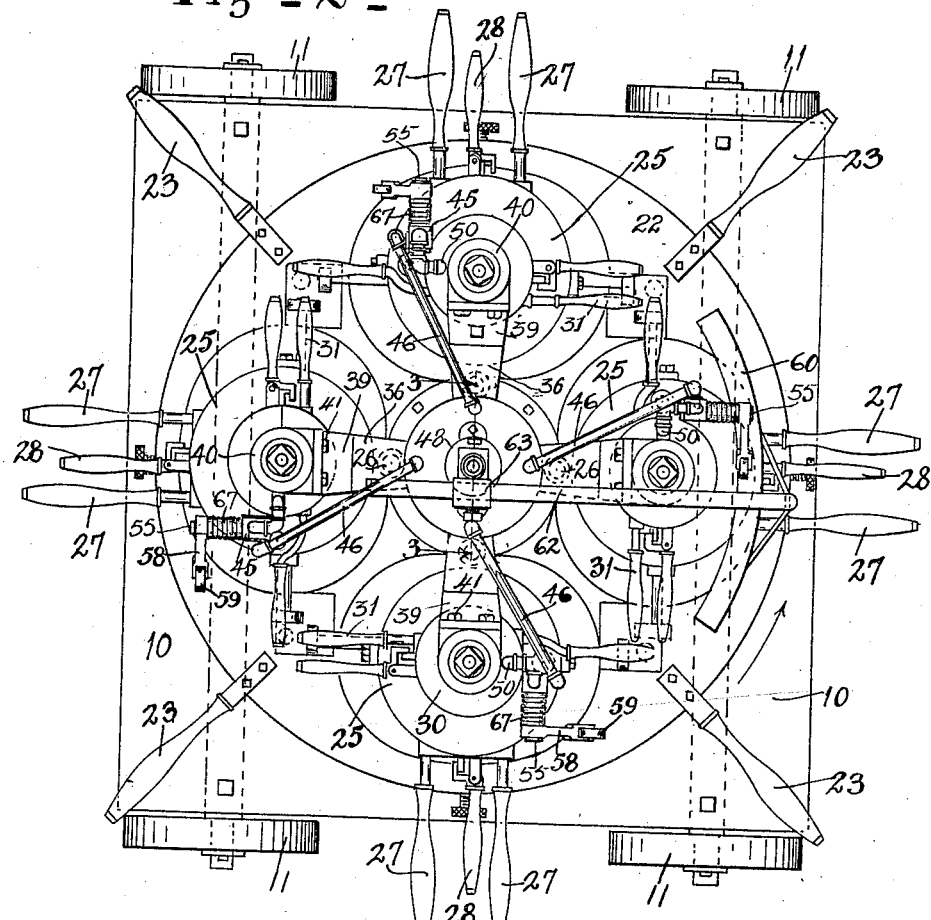
Figure 3:
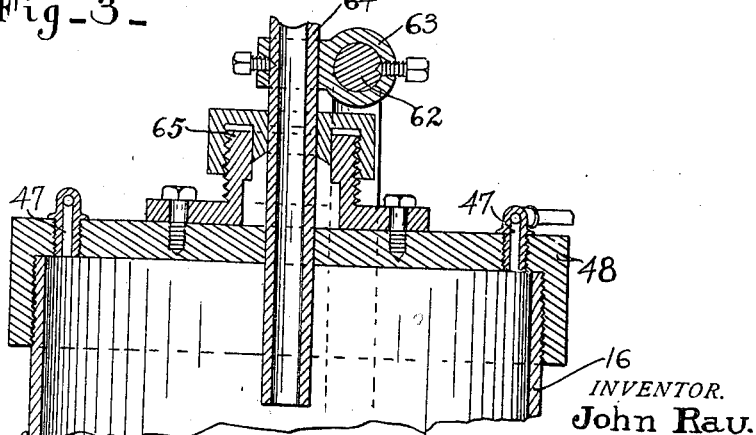

In the drawings, Figure 1 is an elevation of the upper portion of a glass blowing machine including my invention, the lower part of the machine being omitted as containing parts not necessarily material to this invention. Fig. 2 is a plan view of the entire machine. Fig. 3 is a vertical central section through the upper end of the central air reservoir column on the line 3—3 of Fig. 2. Fig. 4 is a central vertical section through said air reservoir column and associated parts. Fig. 5 is a section on the line 5—5 of Fig. 4 showing the spider for carrying the blow-head cylinders and means for securing it to the air reservoir column. Fig. 6 is a side elevation of the compressed air valve along the line 6—6 of Fig. 1, showing the stops for limiting the movement of the valve box. Fig. 7 is the same as Fig. 6 viewed from the line 7—7 of Fig. 6. Fig. 8 is a section on the line 8—8 of Fig. 1 showing the compressed air blow-head.

In detail, there is shown herein a platform 10 carried by four wheels 11, said platform being centrally recessed at 12 to receive a circular bearing plate 13 which is provided with an annular ball race for the bearing balls 14, upon which the lower portion 15 of the central air reservoir column 16 rests and is mounted so as to be readily rotatable. A fixed tubular stand 17 surrounds the lower part of the hollow column 16 and at the lower end is secured upon the platform 10 in such manner as to maintain the hollow column 16 upright and not interfere with the rotation of the latter. Upon the tubular stand 17 there is secured a head 18 upon which a bearing plate 19 is bolted. This bearing plate has a ball race in its upper surface for the bearing balls 20 and upon said balls there is supported a bearing plate 21 which is secured to the lower part of the blow-mold table 22. This table has secured to it handles 23 which extend outwardly, see Fig. 2, and whereby the table is revolved. A split collar 24 is secured to the table 22 and surrounds the hollow column 16 and is clamped thereon so that said table 22 and column 16 rotate together. This manner of constructing the parts described enable them to be readily assembled or separated when necessary, and a double set of ball-bearing supports are provided for the table and column. By that is meant that the bearing balls 14 not only tend to support the column 16 but also the table 22, and likewise, the bearing balls 20 not only tend to support the table 22 but also the column 16, and being remote from each other, an unusually strong construction is provided and yet it is capable of being turned by hand easily although the machine carries a number of extremely heavy blow molds and other parts. Each blow mold and lift-over when the machine is in operation weighs at least 500 pounds.

In Fig. 1 the blow molds 25 are shown formed of two halves hinged together at 26 and having handles 27 thereon and a lock handle 28. There are also shown upon the blow molds lift-overs 30 with handles 31. The details of the lift-overs and blow-molds need receive no further attention, as the nature of the invention will be understood without the same being more fully set forth.

On the compressed air column 16 above the blow-mold table 22 a spider 35 is secured in the manner shown in Fig. 5. It consists of a cylindrical portion split on one side and provided with four radiating T-bar arms 36, and through the lower flanges of two of said arms a tie-rod 37 extends, whereby said arms are drawn toward each other for clamping the spider in place. Upon the outer end of each arm 36 of said spider there is secured by a bolt 38 an angle plate 39, and against the outer surface of the vertical portion of each of said angle plates 39 air cylinders 40 for the blow-heads are secured by bolts 41, see Fig. 2. The cylinders 40 are constructed in the usual manner for moving and supplying air through the blow-heads 44. The blow-heads 44 are mounted upon and supported by tubes 43 leading from the cylinders 40 and are constructed as shown in Fig. 8. The blow-head is hollow and cylindrical and its bottom has vents 144 through which air goes to the blow-mold. The blow-head is mounted loosely on the tube 43 and within the blow-head there is a piston 143 secured to the lower end of the tube 43, which piston is of peculiar shape, having in it a contracted passageway located below the valve seat 145. There is a gravity valve 146 therein with a downwardly extending projection 147 adapted when the piston 143 is forced downward relatively to the blow-head 44 to engage the bottom of the blow-head and thus lift the valve 146 off its seat. Thus, when the blow-head first comes down upon the lift-over, the downward movement of the blow-head is checked, but there is still further movement thereafter of the piston 143 which causes the valve to open, as just explained. Hence, a slight lift of the blow-head will cause the closing movement of the valve 146.

Each cylinder 40 has a flat face against the angle plate 39, but is otherwise cylindrical, see Fig. 1. There is a valve box 45 associated with each cylinder 40, which takes air from the central air column 16, through the tube 46 which is connected with a nipple 47, which screws into the cap 48, which is screwed upon the upper end of the air column 16, see Fig. 3. In the machine shown there are four blow-heads and an equal number of valve boxes. An air pipe 50 extends from the upper end of each valve box to the upper end of the cylinder 40, and another pipe 51 extends from the lower end of the valve box to the lower portion of the cylinder 40, so that when the air enters the upper end of the cylinder 40 the blow-head 44 will be depressed, and when the air enters through the pipe 51 the blow-head will be lifted.

Within the valve box 45 the valve is mounted on the valve stem 55, a transversely extending shaft projecting outside the valve box. The exact construction of mounting the valve is not shown, as there is nothing in that which is peculiar and it is familiar to all mechanics. On said shaft or valve stem 55 there is a stop arm 56 secured which is adapted to engage a shoulder or stop 57 on the side of the valve box, see Fig. 6, and limit the movement of the valve in one direction so as to leave a communication normally between the pipes 46 and 51, whereby the blow-head will be maintained normally elevated. In order to operate the valve so as to cut off said communication between the pipes 46 and 51 and establish a communication between the pipes 46 and 50 so as to lift the blow-head, a crank arm 58 is secured to said valve stem 55, and on its outer end a roller 59 is mounted in position to engage an inclined track 60 carried by the bracket 61 on the lower end of a downwardly extending portion of the rod or arm 62, which has a horizontal upwardly extending portion removably secured by the clamp 63 to the tube 64, which leads from some suitable source of compressed air through a stuffing box 65 into the upper end of the hollow air column 16, see Fig. 4. It is to be understood that the pipe 64 is stationary, and, therefore, the rod 62 and inclined track 60 is likewise stationary, and when the machine is operated and the parts revolve, the arm 58 rides upon the track 60 and is thereby moved to the left from the position shown midway in Fig. 1. While the arm 58 is thus actuated by the track 60, the valve will let in the air to depress the blow-head, and also to supply air therethrough to the blow mold. As soon as the arm 58 leaves the track 60, the spring 67 returns said arm and valve until stopped by the stop arm 56 engaging the stop 57 on the valve box. Then the blow-head is returned to its upper position.

It is thus seen that I have been able by hand to handle and revolve a very heavy machine and one capable of blowing very large hollow glassware. The table revolves the air column and also the blow-head supporting and operating means. In fact, the entire machine revolves excepting the platform and tubular column 17 below and the air inlet tube 64 and track-holding means at the upper end.

Above the rotary mold table and upon the same and between each pair of molds a horizontal plate 75 is secured upon a post 76 in position for rollers 77, carried on the outer ends of the arms 78 from the hinged mold sections adjacent thereto, to ride or travel while the molds are being opened and closed. This is because, for making large hollow glass ware, the mold sections are extremely heavy.

I claim as my invention.

1. A glass blowing machine including a platform with an upwardly extending tubular stand secured thereto, a hollow airtight air column mounted on said platform within said stand and projecting above the same and revoluble therein, a blow-mold table surrounding and secured to said column and having bearing on the upper end of the tubular stand, suitable blow molds on said table, a spider secured to the column above said table, a suitable blow-head construction carried by said spider, tubes for conveying air from the hollow air column to the blow-head construction, and stationary means for supplying compressed air to said air column, whereby revoluble movement of the table will cause a corresponding revoluble movement of the air column and blow-head construction carried thereby.

2. A glass blowing machine including a platform, a tubular stand secured thereon, a hollow air-tight air column mounted within said stand and extending above the same and having a laterally extending bottom bearing plate, ball bearings for supporting said bearing plate, a mold table removably secured to said air column, a bearing plate secured to the underside of said table, ball bearings upon the upper end of the tubular column for supporting said bearing plate and mold table, suitable blow molds on said table, a spider secured to the column above said table, a suitable blow-head construction carried by said spider, tubes for conveying air from the hollow air column to the blow-head construction, a stationary pipe entering the upper end of the air column for supplying compressed air thereto, and a stuffing box on the upper end of the air column through which said pipe extends.

3. A glass blowing machine including a platform, a column mounted thereon so as to be rotary, a removable top for said column, blow-head constructions, and a spider for supporting said blow-head constructions the central portion of which is a split sleeve adapted to slip over said column when the top is removed, and means connected with two of the arms of said spider for clamping the same on the column, substantially as set forth.

4. A glass blowing machine including blow-head constructions, revoluble means for carrying the same, a valve in connection with each blow-head construction provided with a valve stem, an arm thereon, stationary means located within the path of said arm whereby said arm and the valve stem will be actuated as the blow-head constructions are revolved, a spring for returning said arm and valve stem to their normal positions, and a stop on the valve box for limiting the return movement of the valve stem.

5. A glass blowing machine including a revoluble spider, air cylinders connected therewith, blow-heads controlled by said air cylinders, a valve box for each air cylinder and in communication with the top and bottom thereof, means for supplying compressed air to the valve box, a valve having a stem for controlling the passage of air through the valve box, an arm on said valve stem having a roller on the outer end thereof, a stationary inclined track mounted in position to be engaged by said arm and roller for actuating the valve stem, a spring on the valve stem for returning it, a stop arm on the valve stem, and a stop on the valve box to be engaged by the valve stem to limit the same in its return movement.

6. A glass blowing machine including a revoluble hollow column, means for introducing compressed air therein, a spider secured thereon, air cylinders connected with said spider, a blow-head for each air cylinder, a valve box connected with each cylinder and in communication with both the bottom and top thereof, an air tube leading from said column to said valve box, valve mechanism in said valve box for controlling the passage of air therethrough, and stationary means adapted to cause the actuation of the valve mechanism in each valve box as the said column and associated parts are revolved.

In witness whereof, I have hereunto affixed my signature in the presence of the witnesses herein named.

JOHN RAU.

Witnesses:
E. H. MAYO,
O. M. McLAUGHLIN.